Nov. 10, 1936.  R. WILLIAMS  2,060,544
METHOD AND APPARATUS FOR CONSTRUCTING PIPE
Filed Nov. 8, 1934
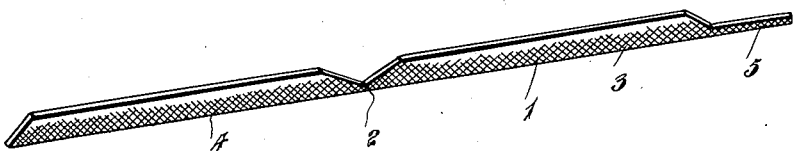
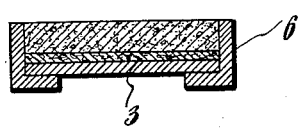
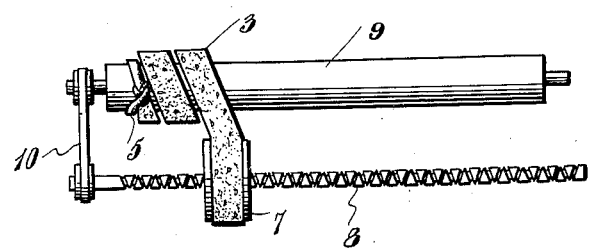
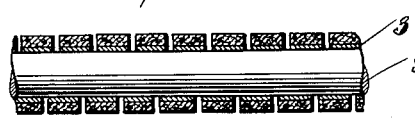
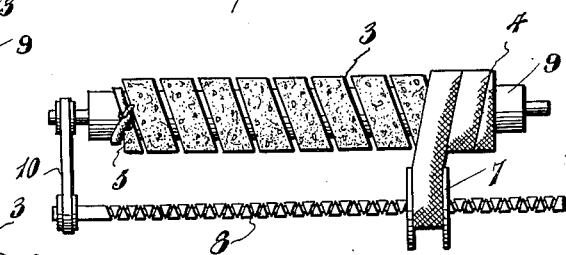
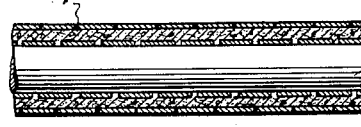
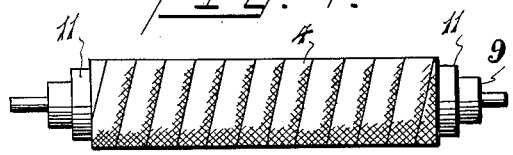
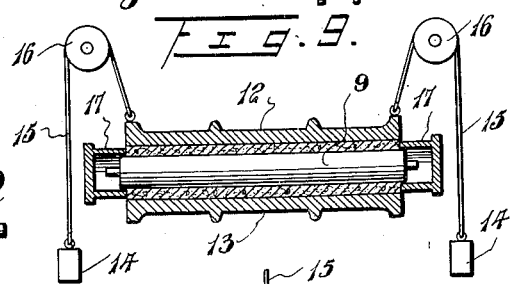
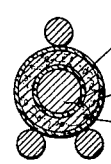
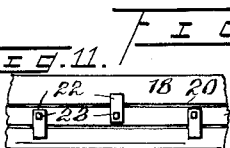
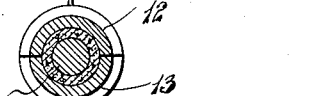
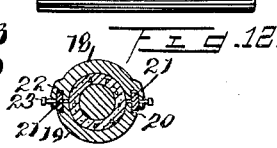
Inventor
Ralph Williams

UNITED STATES PATENT OFFICE 2,060,544

METHOD AND APPARATUS FOR CONSTRUCTING PIPE

Ralph Williams, Sydney, New South Wales, Australia

Application November 8, 1934, Serial No. 752,149

11 Claims. (Cl. 25—30)

This invention is directed to a method and apparatus for constructing pipe, particularly fibrous asbestos cement pipe, with a view to providing for greater than usual economy in the manufacture and to permitting the construction of such pipe to a small diameter with maximum strength.

In carrying out the method, a predetermined length of canvas or like tape having a width bearing a definite relation to the diameter of the pipe to be constructed is divided transversely for a portion of its thickness, providing two sections of tape with a relatively thin portion uniting them. One of the sections of tape is covered with the pipe material, as asbestos fiber and cement, preferably in a mold, with the width and length of the material corresponding to that of the tape section and the thickness slightly in excess of that desired for the thickness of the wall of the completed pipe.

The entire tape is then wound upon a reel, the non-covered portion of the tape being first positioned on the reel, followed by the covered portion. The end of the tape at the covered portion is then fixed to a mandrel and the reel fed longitudinally of a shaft so as to apply the covered portion of the tape in spiral formation about the mandrel, the spiral turns being separated for a slight distance, say approximately a quarter of an inch, and the mandrel being chosen of a length to accommodate the covered portion of the tape and of a diameter corresponding to that desired in the completed pipe.

When the reel has laid the covered portion of the tape on the mandrel in spiral formation, its feeding movement on the shaft is reversed and the uncovered portion of the tape is laid onto the surface of the pipe material which has been previously deposited upon the mandrel in spiral form. The uncovered portion of the tape is laid smoothly and evenly in spiral form onto the material and under sufficient pressure to cause the material, which, of course, is still plastic, to spread laterally and take up the spaces between the spiral convolutions of the first layer on the mandrel. This results in uniting the material throughout the full peripheral area of the mandrel and thus the material on the surface of the mandrel is, so to speak, welded into one mass.

End rings are then placed on the mandrel, which rings have a thickness beyond the surface of the mandrel which exactly corresponds to the required thickness to which the material on the mandrel is to be initially rolled. The mandrel with the material, outer covering of tape and the rings is then rolled. The rolls are arranged so that they may be readily adjusted relatively in order that a complete rolling action may be had of the material on the mandrel until the thickness of such material is slightly greater than the similar dimensions of the end rings.

During this rolling operation, a considerable quantity of water, necessarily inherent in the material as applied, is expressed and the material naturally compressed incident to this loss of water and to the rolling operation. The mandrel with the rolled material thereon is then removed from the rolls and the tape wrapping on the outer surface of the material, which has heretofore protected the material during initial rolling, is removed.

The mandrel with the material and end rings is again subjected to the action of the rolls without the outer covering of tape and the rolling operation is continued until the thickness of the material corresponds to that of the end rings. Incident to the second rolling, the outer surface of the material is perfectly smooth and reduced to such a dimension as to fit accurately into a metal mold in which the next step is carried out.

The mold is divided longitudinally into halves and the mandrel and material is placed in the mold and the mold placed in a press. In addition to the mold, plungers are arranged at the respective ends of the mold and adapted to bear upon the ends of the material in the mandrel. Pressure is applied to the mold sections and to the end plungers, the latter, of course, acting in opposite directions and during this operation, a very material portion of the remaining water is forced out of the material through the juncture between the parts of the mold.

When sufficient water has been extracted and the material is compacted to the desired degree, the mandrel is either forced out of the pipe section or otherwise removed. During this removal operation of the mandrel and incident to the pressure of the mold parts, the interior of the completed pipe will be polished to a glass-like finish. The end plungers are then removed and the upper half of the mold taken off and the lower half of the mold, together with the completed pipe, is moved to a place convenient for the removal of the pipe from the mold.

The apparatus in the form best adapted for carrying out the process is illustrated in the accompanying drawing, in which:

Figure 1 is a perspective view of the tape.

Figure 2 is a transverse section through the mold in which the material making up the pipe proper is applied to a selected portion of the tape.

Figure 3 is a view in elevation showing the mandrel, reel on which the tape with the applied material is wound and the shaft for feeding the reel to lay the tape on the mandrel.

Figure 4 is a similar view showing the reverse operation of the reel to place the uncovered portion of the tape on the material laid in spiral formation on the reel.

Figure 5 is a longitudinal section through the mandrel and material prior to the return movement of the reel and the application of the uncovered layer of tape.

Figure 6 is a longitudinal section through the mandrel and material thereon following the completion of the laying on of the tape in both directions.

Figure 7 is an elevation of the mandrel and material thereon with the end rings to determine the thickness of the rolled material.

Figure 8 is a sectional view illustrating the rolling operation.

Figure 9 is a longitudinal section of the press mold.

Figure 10 is a transverse section of the same.

Figure 11 is a broken elevation of a modified form of pressure mold.

Figure 12 is a transverse section through the same, the article being shown in position.

In the apparatus designed for the carrying out of the method, a tape 1, preferably of coarse canvas or the like, is employed, the width of which has a predetermined relation to the diameter of the pipe to be constructed. This tape is weakened at the line 2 by an appropriate cut, as indicated, to provide two sections 3 and 4 on opposite sides of the division. The tape at the end of the section 3 remote from the section 4 is also cut away to provide a thin flexible section 5 for securing the same on the mandrel, as will later appear.

The section 3 of the tape is then placed in a form, preferably of metal and indicated at 6, and the material of which the pipe is to be made, such for example as asbestos fiber and cement, is applied on the surface of this section 3 of the tape. The material contains sufficient water so that it may be readily troweled in position and yet maintain its integrity when relieved from the form.

The full length of the tape is then wound upon a reel 7, the uncovered portion of the tape being first wound upon the reel and followed by the covered portion. The reel is then mounted upon a shaft 8 so formed that, during revolution of the shaft, the reel may be fed longitudinally of the shaft at a predetermined speed, the feeding means of the shaft being so arranged that when the reel reaches one end of the shaft, the feed of the reel will be immediately reversed.

A mandrel 9 having a diameter corresponding to that of the desired bore of the pipe to be constructed is appropriately mounted and driven in synchronism with the shaft 8 by any appropriate means, such as indicated at 10. The thin end 5 of the tape is secured to one end of the mandrel and during the turning of the mandrel and the longitudinal feed of the reel, the covered portion of the tape is laid on the mandrel in spiral form. The correlation of the parts must be such that the mandrel will at least receive the entire covered portion of the tape and the feed of the reel must be such that in laying the covered portion of the tape onto the mandrel, the adjacent edges of the convolutions of such covered portion will be definitely spaced apart, say for approximately one-quarter of an inch.

When the reel has reached the end of its travel, the covered portion of the tape will be laid in spiral form on the mandrel, whereupon the reel immediately reverses itself and lays the uncovered portion of the tape on the material in reverse spiral form. Incident to this operation, the pressure of the uncovered portion of the tape as wound in spiral form on the material in the mandrel will cause such material, which, of course, is still in plastic form, to spread under the pressure of the tape winding until the adjacent edges of the spiral layer of material, which when laid has been spaced apart, will be caused to unite, thus welding the material on the mandrel in an unbroken, even layer throughout the appropriate length of the mandrel.

As so far constructed, the material of which the pipe is to be made exists as a layer between inner and outer tape sections which are wound in relatively reverse spiral form with respect to the length of the material. The application of the uncovered portion of the tape in reverse spiral form is, of course, speedily carried out, necessitating no stopping of the mechanism, and while this tape is applied to cover the material, its spiral form facilitates the adjustment of the length of the tape to the reduced diameter incident to the rolling of the material which is the next step in the operation.

Previous to the rolling, end rings 11 are placed on the mandrel at the respective ends of the material and the mandrel subjected to the action of rolls 12 conventionally arranged so as to roll the material and, of course, permit relative adjustment to carry out and provide for such rolling. The rolling is continued to compress the material and express a considerable portion of water, which up to this time has remained in the material, it being preferred that the rolling operation be carried out until the thickness of the material in the mandrel is slightly in excess of the corresponding dimension of the end rings.

The mandrel with the rolled material thereon is then removed from the rolls and the outer tape wrapping removed. The mandrel with the material now freed from the outer covering is returned to the rolls and the rolling operation carried out until the thickness of the material on the mandrel corresponds to the similar dimension of the end rolls. This rolling operation acts directly on the material and serves primarily to provide a smooth, perfectly even outer surface on the material. In addition to this result, the second rolling operation reduces the maximum diameter of the material into correspondence with the interior diameter of a sectional mold in which the next succeeding step is carried out.

This final mold is divided longitudinally to present upper and lower sections 12 and 13 and the mandrel with the material in the shape developed in the second rolling is placed in the lower section 13 of the mold and the upper section 12 applied. The upper section of the mold is preferably balanced by weights 14 and cables 15 leading over an overhead roller 16 and terminally connected to the upper mold section.

End pressure elements 17 of a size to fit over the mandrel with their ends bearing against the material on the mandrel are positioned to engage the ends of the material and the mold is subjected to pressure and at the same time the end plungers 17 are moved inwardly toward each other under other appropriate pressure means. The mold, which may be subjected to the desired pressure in a conventional press, serves, as a result of this pressure, to more effectively compact the material and express a very considerable portion of the remaining water therefrom. The end plungers serve to prevent endwise spread of the material and to further compact the same longitudinally.

After the material has been subjected to the required pressure, the mandrel is removed from the interior of the material form, either by end pressure, as by a ram, or other appropriate pulling means in any conventional or desired manner.

During this removal of the mandrel, there will result a polishing operation on the inside of the material form or pipe, which polishing operation is of such high order as to approach a glass-like finish. Following the removal of the mandrel, the pressure on the plungers is relieved and the plungers removed. The upper section 12 of the mold is lifted from its position and the completed pipe section in the lower mold removed from the press to a convenient position for the removal of the pipe.

A modified form of final mold is illustrated more particularly in Figures 11 and 12, wherein the mold sections 18 and 19 are formed at their meeting edges to together provide a recess 20 extending the length of the mold and designed to receive a flexible sealing strip 21 which thus bridges the meeting edges of the mold sections. One or both of the mold sections are provided with fixed bracket arms 22 to receive set-screws 23 to bear upon the sealing strip.

By this construction, the sealing strip may, by means of the set-screws 23, be maintained in sealing relation at the meeting ends of the mold sections, except at the mid-point or central portion of the length of the mold. Under endwise pressure of the elements 17, the only outlet for the water being expressed is at the center of the mold, so that this particular portion of the material is thus initially subjected to the requisite compression to insure rigidity. As the pressure of the elements is continued, the set-screws are progressively released toward the ends of the mold, so that the escape of the water incident to the compression of the material is gradually permitted from the center toward the ends.

This operation insures that the material will be effectively compressed, beginning at the central point and gradually approaching the ends or the points at which the elements are directly active. If provision of this type were not made, it is possible that the material immediately adjacent the ends would be compressed to an extent to prevent requisite compression at the center of the material and thus result in an effective result.

The rolls for initially rolling the wrapped material on the mandrel are to be of any desired form or relation and are preferably constructed so that they may be conveniently adjustable bodily in radial directions to accommodate different sizes of pipes. Any conventional construction to this end is contemplated. Of course, the mandrel may be either solid or collapsible, both such types of mandrels being well known in the art and requiring neither illustration nor description herein.

The pipe so constructed will obviously be free of porosity or weakness and pipe sections constructed in accordance with the present method and apparatus have been tested and found able to withstand pressures of approximately eighty pounds per square inch.

The material of which the pipe is to be composed, while preferably of asbestos fiber and cement, may obviously be of other materials so long as such materials, when combined, will lend themselves to the carrying out of the present process.

What is claimed to be new is:

1. A method of forming composite pipe, including the steps of spreading the material upon a portion of the length of a flat flexible support, the remaining length of the support being free of material, rolling the support and material into spiral form, rolling the support free of material in reverse spiral form on the previously rolled material and support, and thereafter subjecting the material to rolling and pressing to complete the pipe formation.

2. A method of making composite pipe, including the steps of initially forming the material upon a portion of the length of a flexible support, the remaining length of the support being free of material, rolling the support and material in spiral form, with the edges of the material spaced, rolling the support free of material in reverse spiral form on the previously rolled material and support, exerting pressure upon the material to spread the material to take up the space between the edges thereof, and thereafter rolling and pressing the material into pipe form.

3. A method of forming composite pipe, including the steps of molding the material on a part of the length of a flexible support, the remaining length of the support being free of material, arranging the length of support having material in spiral form with the edges spaced, applying that length of the support free of material as a flexible layer on the material to compress and support the same to take up the spaces, and finally rolling and pressing the material to complete the pipe.

4. A method of making composite pipe, consisting in molding the material in flat form on a part of a length of flexible support, arranging that portion of the support carrying the material in spiral form with spaced edges on a mandrel, winding the remaining portion of the support in spiral form upon the material to compress and spread the same to take up the spaces, and subjecting the material to rolling and pressing to complete the pipe formation.

5. A method of forming composite pipe, consisting in initially molding material in flat form, rolling the material in spiral form with spaced edges, exerting pressure upon the material to cause a lateral spread of the same to take up the spaces, rolling the material to compress the same, and finally exerting annular and endwise pressure upon the material to complete the pipe.

6. An apparatus for forming a composite pipe from molded pipe material secured to a portion of a length of tape, comprising a mandrel, means for rolling the material and that portion of the tape covered by the material in spiral form on the mandrel, and means for rolling the uncovered portion of the tape upon the spirally formed material and tape to compress the same.

7. An apparatus for forming a composite pipe from molded pipe material secured to a portion of a length of tape, comprising a mandrel, means for rolling the covered portion of the tape on the mandrel in spiral form with spaced edges, and means for rolling the uncovered portion of the tape in reverse spiral form upon the material and tape on the mandrel.

8. An apparatus for forming a composite pipe from molded pipe material secured to a portion of a length of tape, comprising a reel on which the entire length of tape is wound, a mandrel, means for operating the mandrel and feeding the reel axially to deliver to the mandrel in spiral form that portion of the tape covered with the material, means for reversing the feed of the reel with respect to the mandrel to deliver upon the material on the mandrel the uncovered portion of the tape in reverse spiral form, and means for subjecting the material on the mandrel to completing pressure and formation.

9. A construction as defined in claim 8, wherein that portion of the tape covered with the material is wound upon the mandrel in spiral form with spaced edges, the application of the uncovered portion of the tape in reverse spiral form serving to spread the material to take up said space.

10. A construction as defined in claim 8, wherein the means for completing pressure and formation includes mechanism for applying pressure to the material on the mandrel circumferentially and axially of the mandrel.

11. A construction as defined in claim 8, wherein the fluid escaping under the pressure of the means for subjecting the material on the mandrel to pressure and formation is utilized to control the effect of the pressure.

RALPH WILLIAMS.